United States Patent Office 2,782,229
Patented Feb. 19, 1957

2,782,229

PREPARATION OF ADDUCTS OF LIQUID LINEAR POLYBUTADIENE AND FUMARIC ACID ESTERS

Joachim Dazzi, Dayton, Ohio, assignor to Monsanto Chemical Company, St. Louis, Mo., a corporation of Delaware No Drawing. Application April 27, 1953,
Serial No. 351,513

5 Claims. (Cl. 260—485)

This invention relates to high molecular weight adducts and more particularly provides linear polymeric compounds having a plurality of carboxylate radicals and a process for producing the same.

An object of the invention is the provision of new and useful polycarboxylates. Another object of the invention is the preparation of viscous polycarboxylates from readily available polymeric liquids. Still another object of the invention is the preparation of viscous linear polycarboxylates from butadiene hydrocarbon polymers. A further object of the invention is to provide for the coatings, synthetic resins and plastics, plasticizer, rubber and textile industries a new class of viscous polymeric materials having a high content of carboxylate radicals.

These and other objects of the invention hereinafter disclosed are provided by the following invention wherein there are prepared viscous adducts of (1) a liquid polymeric butadiene hydrocarbon with (2) an ester having the formula

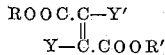

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals and Y and Y' are selected from the class consisting of hydrogen, halogen and the methyl radical, from 1 to 3 moles of said ester being combined at each of at least 5 percent of the olefinic units of said polybutadiene.

Esters having the above formula and useful for the present purpose include fumarates, chlorofumarates, dichlorofumarates, mesaconates and dimethylfumarates, e. g., the simple alkyl fumarates such as methyl, ethyl, isopropyl, n-propyl, n-butyl, tert-butyl, isoamyl, n-hexyl, n-heptyl or isooctyl fumarates; the mixed alkyl fumarates such as ethyl methyl fumarate, methyl n-octyl fumarate and butyl 2-ethylhexyl fumarate; the simple alkoxyalkyl fumarates such as bis(2-methoxyethyl), bis(3-ethoxy-n-propyl), and bis(4-butoxybutyl) fumarates; the mixed alkoxyalkyl fumarates such as 3-propoxypropyl 2-ethoxyethyl fumarate or methoxymethyl 2-amyloxyethyl fumarate and fumarates derived from both a fatty alcohol and a glycol mono-ether such as ethyl 2-ethoxyethyl fumarate or n-amyl 3-propoxy-2-propyl fumarate, the hydroxyalkyl fumarates such as bis(2-hydroxyethyl) fumarate or n-propyl 3-hydroxypropyl fumarate; the alicyclic fumarates such as cyclopropyl fumarate, cyclopentyl fumarate and cyclohexyl fumarate or octyl cyclopentyl fumarate; the alkylmercaptoalkyl fumarates such as bis(4-ethylmercaptobutyl) fumarate; the aryl fumarates such as phenyl fumarate, β-naphthyl fumarate and 2-xenyl fumarate or ethyl phenyl fumarate, 2-ethoxyethyl β-naphthyl fumarate; the aralkyl fumarates such as benzyl fumarate or amyl benzyl fumarate; furfuryl fumarate, tetrahydrofurfuryl fumarate, phenyl furfuryl fumarate; as well as the corresponding halogenofumarates, e. g., butyl chlorofumarate or ethyl phenyl bromofumarate; the dihalogenofumarates, e. g., bis(2-ethoxyethyl) dichlorofumarate; the corresponding mesaconates, e. g., 2-xenyl mesaconate; the corresponding dimethylfumarates, e. g., n-amyl dimethylfumarate, etc.

Liquid butadiene hydrocarbon polymers which add to the above fumarates are the low molecular weight, liquid polymers of butadiene hydrocarbons such as 1,3-butadiene, isoprene, piperylene, dimethylbutadiene, 2-methylpentadiene, 2-ethylhexadiene and the like. The presently useful polymers may also be liquid polymers derived by copolymerization of two or more different butadiene hydrocarbons, e. g., from a mixture of butadiene and piperylene.

Reaction of the liquid polymers with the present fumarates or the like to form adducts takes place readily by heating the polymer with the ester in the presence or absence of an inert diluent or polymer solvent at ordinary or superatmospheric pressures. When operating at atmospheric pressure, temperatures of from, say 125° C. to 300° C. and preferably of from 150° C. to 225° C. are used. When working with readily polymerizable fumarates an inhibitor of polymerization may be incorporated into the reaction mixture. The number of carboalkoxy groups introduced into the liquid polymer molecule depends upon the diene content of the polymer, upon the nature of the individual ester used, and upon the reaction conditions employed. Generally, operation within the higher temperature ranges, i. e., at temperatures of above, say, 180° C. and below the decomposition point of any of the reactants leads to introduction of more carboalkoxy groups than does operation at the lower temperatures. The degree of carboalkoxylation also depends upon the individual fumarate employed. Usually the lower alkyl fumarates are more reactive than either the higher alkyl fumarates or the higher alkoxyalkyl fumarates. In view of the effect of the reaction conditions and nature of the fumarates upon the extent of carboalkoxylation, it is recommended that for each initial run there be experimentally determined the operating conditions which should be observed for obtaining the desired degree of carboalkoxylation.

The quantity of fumarate present in the adduct will also depend upon its availability in the reaction mixture. Obviously, for the formation of adducts in which at least one mole of the fumarate has added to each olefinic unit of the liquid polymer, the calculated amount of fumarate must be present in the reaction mixture.

Since the presently useful fumarates are miscible with the liquid polymers under the reaction conditions used, no extraneous solvent or diluent need be employed. However, in some instances, it may be advantageous to work with a solution of the polymer in an inert, extraneous diluent or solvent, e. g., a liquid hydrocarbon or a liquid derivative thereof such as benzene, xylene, nitrobenzene or dichlorobenzene, a high-boiling aliphatic hydrocarbon such as kerosene, halogenated hydrocarbons such as chloroform or tetrachloroethane, etc. When operating at atmospheric pressure, such diluent is generally removed before reaction of the polymer with the fumarate occurs, due to the high temperatures used. For successful reaction, the diluent may or may not be present. In order to avoid local over-heating, the heating and distilling operations are preferably conducted on the oil-bath.

The contemplated use of the liquid polybutadiene-fumarate adducts will determine the extent of carboalkoxylation desired. Adducts having a low proportion of carboalkoxy radicals are advantageously employed as adhesives, particularly as adhesives in bonding of cellulosic materials. Adducts having a higher proportion of carboalkoxy groups, on the other hand, are useful as synthetic resin plasticizers.

That the liquid polybutadiene-fumarate reaction products are adducts rather than blends of the polybutadiene and polymeric fumarate is evidenced by hydrolysis of the reaction products to completely water-soluble materials. Thus, as will be hereafter disclosed, upon heating the present reaction products with aqueous alkali metal hydroxides or ammonia, they are entirely conv... water-soluble salts. T...

the present add...
284/172 or 1.65...
age of 0.825 mole...
each butene unit of th...
content has calculated...
These agree very well w...
above.

Example diene-dibutyl fumarate adduct. The calculated carbon and hydrogen contents of a 1:2.22 polybutadiene-butyl fumarate are 66.4% C and 8.83% H. These agree with the observed values shown above.

*Example 6*

Complete hydrolysis of the adduct of liquid polybutadiene plus 2.22 moles of butyl fumarate (of Example 5) was accomplished by refluxing, for 6 hours, 50 g. of the adduct in a solution of 16 g. of sodium hydroxide in 400 g. of aqueous (50%) ethanol and then removing the alcohol-water mixture by distillation at reduced pressure. The residual sodium salt was completely soluble in cold water.

What I claim is:

1. The process which comprises heating, at a temperature of 125° C. to 300° C., a liquid, linear polymeric butadiene hydrocarbon with an ester selected from the class consisting of an alkyl fumarate having from 1 to 8 carbon atoms in the alkyl radical and an alkoxyalkyl fumarate having from 2 to 8 carbon atoms in the alkoxyalkyl radical and tetrahydrofurfuryl fumarate, and recovering from the resulting reaction product a viscous adduct in which from 1 to 3 moles of said ester are combined at each of at least 5 percent of the olefinic units of said polymeric hydrocarbon.

2. The process which comprises heating liquid, linear polymeric butadiene with an alkyl fumarate having from 1 to 8 carbon atoms in the alkyl radical, at a temperature of from 125° C. to 300° C. and recovering from the resulting reaction product a viscous adduct in which from 1 to 3 moles of the fumarate are combined at each of at least 50 percent of the butene units of said liquid polybutadiene.

3. The process which comprises heating liquid, linear polymeric butadiene with ethyl fumarate at a temperature of from 150° C. to 225° C. and recovering from the resulting reaction product a liquid adduct in which from 1 to 3 moles of said fumarate are combined at each of at least 50 percent of the butene units of the polybutadiene.

4. The process which comprises heating liquid, linear polymeric butadiene with butyl fumarate at a temperature of from 150° C. to 225° C. and recovering from the resulting reaction product a liquid adduct in which from 1 to 3 moles of said fumarate are combined at each of at least 50 percent of the butene units of the polybutadiene.

5. The process which comprises heating liquid, linear polymeric butadiene with bis(2-ethoxyethyl) fumarate at a temperature of from 150° C. to 225° C. and recovering from the resulting reaction product a liquid adduct in which from 1 to 3 moles of said fumarate are combined at each of at least 50 percent of the butene units of the polybutadiene.

References Cited in the file of this patent

UNITED STATES PATENTS

| | | |
|---|---|---|
| 2,383,055 | Fryling | Aug. 21, 1945 |
| 2,468,769 | Morris | May 3, 1949 |
| 2,529,322 | Zimmer | Nov. 7, 1950 |

OTHER REFERENCES

Birch et al.: Ind. Eng. Chem. 24 (1932), pp. 49–50.